United States Patent [19]

Bouverot et al.

[11] 4,442,060
[45] Apr. 10, 1984

[54] INJECTION-MOLDING OF PASTY, THERMOSETTING ORGANOPOLYSILOXANE COMPOSITIONS

[75] Inventors: Noel Bouverot, Saint Symphorien D'Ozon; Paul Medard, Oullins; Alain Viale, Venissieux, all of France

[73] Assignee: Rhone-Poulenc Industries, Paris, France

[21] Appl. No.: 337,844

[22] Filed: Jan. 7, 1982

[30] Foreign Application Priority Data

Jan. 7, 1981 [FR] France ................................ 81 00114

[51] Int. Cl.$^3$ ................................................ B29G 3/00
[52] U.S. Cl. ............................... 264/328.2; 264/328.6; 528/74
[58] Field of Search .................... 264/328.2, 328.6; 528/24

[56] References Cited

U.S. PATENT DOCUMENTS 2,838,472 6/1958 Lucas ................................ 260/46.5
4,173,560 11/1979 Homan ............................... 523/213

FOREIGN PATENT DOCUMENTS 2504357 7/1975 Fed. Rep. of Germany .
2453197 2/1980 France .
 760451 10/1956 United Kingdom .
 797979 7/1958 United Kingdom .
2049717 12/1980 United Kingdom .

OTHER PUBLICATIONS

Plastiques Modernes et Elastomeres, vol. 31, No. 10, Dec. 1979, pp. 77–78.

*Primary Examiner*—Thomas P. Pavelko
*Attorney, Agent, or Firm*—Burns, Doane, Swecker & Mathis

[57] ABSTRACT

Pasty organopolysiloxane compositions are facilely injection-molded into elastomeric shaped articles at low pressures, at a temperature ranging from about 125° C. to about 225° C., and in a molding cycle of less than about 25 seconds, said pasty organopolysiloxane compositions comprising an intimate admixture of:

($A_1$) 100 parts by weight of a diorganopolysiloxane oil having a viscosity of 500 to 300,000 mPa.s at 25° C., consisting essentially of recurring units of the formula $R_2SiO$ and blocked at each end of the chain by units of the formula $R_2R'SiO_{0.5}$, in which formulae the symbols R, which are identical or different, represent hydrocarbon radicals which are unsubstituted or substituted by halogen atoms or cyano groups and which have 1 to 8 carbon atoms, and the symbol R' represents the same radicals as the symbols R and also a hydroxyl radical, an alkoxy radical having from 1 to 4 carbon atoms or a $\beta$-methoxyethoxy radical;

($B_1$) 10 to 75 parts by weight of a finely divided reinforcing silica having a specific surface area of at least 50 m$^2$/g;

($C_1$) 1 to 20 parts by weight of a structuring inhibitor; and ($D_1$) 0.1 to 4 parts by weight of 2,4-dichlorobenzoyl peroxide cross-linking agent.

11 Claims, No Drawings

INJECTION-MOLDING OF PASTY, THERMOSETTING ORGANOPOLYSILOXANE COMPOSITIONS

CROSS-REFERENCE TO RELATED APPLICATION

Our copending application, Ser. No. 337,843, filed concurrently herewith and assigned to the assignee hereof.

BACKGROUND OF THE INVENTION

1. Field of the Invention

The present invention relates to the injection-molding of pasty organopolysiloxane compositions, which compositions can be readily transferred or circulated by means of pumps and which are conveniently thermoset to form elastomers. The subject compositions are constituted by intimately admixing diorganopolysiloxane oils, finely divided silicas, structuring inhibitors and a cross-linking agent, the latter being 2,4-dichlorobenzoyl peroxide.

2. Description of the Invention

The prior art relating to the technology of the manufacture of silicone elastomers which are vulcanized under the action of heat and derived from rubbery and hence non-pasty compositions (formed by mixing diorganopolysiloxane gums, inorganic fillers, structuring inhibitors and organic peroxide cross-linking agents) reflects that the choice of the cross-linking agents is closely dependent upon the conditions of vulcanization of the compositions and on the forming apparatus adapted to these conditions.

Thus, 2,4-dichlorobenzoyl peroxide is widely employed for hardening extruded compositions at high temperatures, preferably at about 200°–400° C., in a hot oven, in the ambient atmosphere [U.S. Pat. No. 2,723,960]. On the other hand, it is employed only with discretion in injection molding techniques because, on account of its relatively low decomposition temperature and its rapid rate of decomposition, it is likely to cause the premature hardening of the injection-molded compositions before the molds have been completely filled; this is referred to as scorching (Lynch, *Handbook of Silicon Rubber Fabrication*, pages 35, 36 and 37). It is thus preferred to use dicumyl peroxide and 2,5-bis-(t-butylperoxy)-2,5-dimethylhexane in connection with industrial injection-molding machines (abovementioned text of W. Lynch, pages 66, 67 and 71).

The use of 2,4-dichlorobenzoyl peroxide (together with the use of other peroxides) is described in U.S. Pat. No. 3,791,998 for hardening, not rubbery compositions, but pasty compositions formed by mixing diorganopolysiloxane oils having a viscosity on the order of 100,000 to 750,000 mPa.s at 25° C., inorganic fillers and structuring inhibitors. These compositions are deposited or coated onto fabrics and then hardened, and the materials obtained are used for electrical insulation. The two examples in the noted patent illustrate the use of 2,4-dichlorobenzyl peroxide:

(i) in Example 1, the composition used is hardened by heating for 10 minutes at 160° C., in the atmosphere; and (2i) in Example 2, the same composition is hardened by heating for 3 minutes at a temperature of not more than 120° C., in a mold; it is subjected to compression molding. It will be appreciated that no reference is made in this patent to the injection-molding technique.

However, reference is indeed made thereto in another patent, namely, U.S. Pat. No. 4,173,560, which describes compositions which are fairly similar to the above compositions and are formed by mixing diorganopolysiloxane oils having, per mol, about 2 vinyl radicals bonded to the silicon atoms, and preferably having a viscosity of 200 to 100,000 mPa.s at 25° C., silicas treated with vinylic amidoorganopolysiloxanes, and a cross-linking system consisting of organic peroxides or combinations of organohydrogenpolysiloxanes and platinum derivatives; 2,4-dichlorobenzoyl peroxide is included among the peroxides, but the preferred peroxides are di-t-butyl peroxide, t-butyl perbenzoate and 2,5-bis-(t-butylperoxy)-2,5-di-methylhexane.

Said U.S. Pat. No. 4,173,560 also teaches that the compositions which are destined for molding in a "liquid" injection-molding process have a well-defined viscosity which must not exceed 160 Pa.s, this value probably being determined at 25° C. (column 6, lines 20 to 26 of U.S. Pat. No. 4,173,560). Compositions of this type, therefore, have a relatively low viscosity.

And for their manufacture, these compositions, and those which can be molded by another technique, require the incorporation of finely divided silicas treated in accordance with a process featuring organosilicon compounds (the abovementioned vinylic amidoorganopolysiloxanes) which are not readily available on the silicone market, and solvents. They are hardened in accordance with the conditions of temperature and time normally used by those skilled in the art of silicone elastomers (column 6, lines 5 and 6 of U.S. Pat. No. 4,173,560).

Only Example 3 of the said patent illustrates the use of a peroxide, namely, 2,5-bis-(t-butylperoxy)-2,5-dimethylhexane. The compositions containing this peroxide are heated in a mold for 15 minutes at 175° C.; they are subjected to compression molding; injection molding of these compositions is not illustrated.

Injection molding makes it possible to manufacture high-quality silicone elastomer moldings at rapid rates. In the case of injection-molding rubbery organopolysiloxane compositions, same demands powerful machines which are frequently heavy and expensive (pages 64 to 83 of the aforesaid Lynch text, *Handbook of Silicon Rubber Fabrication*). However, in the case of injection molding the so-called fluid compositions (those of U.S. Pat. No. 4,173,560), such molding can be carried out on inexpensive, light machines, for example of the type used for injection-molding low-viscosity and medium-viscosity plastics in the molten state. It would be advantageous, from an industrial point of view, to adapt these light machines to injection-moldable compositions which are less fluid than the above compositions and are manufactured from finely divided silicas which are untreated or have been treated with organosilicon compounds which are very readily available on the commercial chemical products market, and which contain 2,4-dichlorobenzoyl peroxide as the cross-linking agent. As above indicated, this peroxide has a very rapid decomposition rate, which would make it possible, for example, to increase the number of moldings or mold cycles per unit time, compared with 2,5-bis-(t-butylperoxy)-2,5-dimethylhexane.

SUMMARY OF THE INVENTION

Accordingly, it has now unexpectedly been found, and which is a major object of the present invention, that certain pasty organopolysiloxanes can be readily injection-molded, without the risk of scorching and while utilizing conventional non-heavy duty injection-molding machines of the type used for low-viscosity and medium-viscosity plastics in the molten state, said pasty organopolysiloxane compositions containing 2,4-dichlorobenzoyl peroxide as the cross-linking agent and which are hardened or cured by heating in a temperature zone in which organopolysiloxane compositions are conventionally hardened utilizing the typical, for example, dicumyl peroxide, or 2,5-bis-(t-butylperoxy)-2,5-dimethylhexane.

DETAILED DESCRIPTION OF THE INVENTION

More particularly according to this invention, only certain pasty organopolysiloxane compositions are facilely injection-molded on injection-molding machines operating under low injection pressures, for example, of less than 45 MPa, which certain organopolysiloxane compositions are conveniently constituted by intimately admixing the following constituents (the parts and the percentages are expressed by weight):

($A_1$) 100 parts of a diorganopolysiloxane oil having a viscosity of 500 to 300,000 mPa.s at 25° C., consisting essentially of recurring units of the formula $R_2SiO$ and blocked at each end of the chain by units of the formula $R_2R'SiO_{0.5}$, in which formulae the symbols R, which are identical or different, represent hydrocarbon radicals which are unsubstituted or substituted by halogen atoms or cyano groups and which have from 1 to 8 carbon atoms, and the symbol R' is defined exactly as were the symbols R and also represents a hydroxyl radical, an alkoxy radical having from 1 to 4 carbon atoms or a β-methoxyethoxy radical.

($B_1$) 10 to 75 parts of finely divided, reinforcing silicas having a specific surface area of at least 50 $m^2/g$. These silicas can be untreated or treated; when the silicas are treated, this is advantageously carried out to a degree of at least 5% with commercially available organosilicon compounds providing units selected from among those of the formulae $(CH_3)_2SiO$, $(CH_3)(CH_2=CH)SiO$, $(CH_3)_3SiO_{0.5}$ and $(CH_3)_2(CH_2=CH)SiO_{0.5}$, ($C_1$) 1 to 20 parts of structuring inhibitors, and ($D_1$) 0.1 to 4 parts of 2,4-dichlorobenzoyl peroxide, and said injection-molding thereof being carried out at a temperature ranging from 125° to 225° C. The subject process is quite advantageous in that it permits a hardening time of less than 15 seconds and a molding cycle of less than 25 seconds.

The pasty organopolysiloxane compositions used in accordance with the process of the present invention have a penetration (measured in accordance with French Standard Specification T 60-132) ranging from 90 to 350 and preferably from 100 to 330; these values correspond approximately to viscosities ranging from 55,000 Pa.s at 25° C. to 4,000 Pa.s at 25° C. and preferably from 50,000 Pa.s at 25° C. to 4,500 Pa.s at 25° C., measured with a velocity gradient of 0.1 $s^{-1}$.

The diorganopolysiloxane oils $A_1$ having a viscosity of 500 to 300,000 mPa.s at 25° C. and preferably of 800 to 250,000 mPa.s at 25° C. are linear polymers consisting essentially of the aforementioned units of the formulae $R_2SiO$ and $R_2R'SiO_{0.5}$; however, it is also envisaged that same may comprise minor amounts, representing at most 1% by number, of units of the formulae $RSiO_{1.5}$ and/or $SiO_2$.

The hydrocarbon radicals which are unsubstituted or substituted by halogen atoms or cyano groups, and which have from 1 to 8 carbon atoms and are represented by the symbols R, include:

(i) alkyl and halogenoalkyl radicals having from 1 to 3 carbon atoms, such as methyl, ethyl, propyl, isopropyl and 3,3,3-trifluoropropyl radicals;

(ii) alkenyl radicals having from 2 to 4 carbon atoms, such as vinyl, allyl and but-2-enyl radicals, (iii) cycloalkyl and halogenocycloalkyl radicals having from 5 to 6 nuclear carbon atoms, such as cyclopentyl, cyclohexyl, methylcyclohexyl and chlorocyclohexyl radicals, (iv) mononuclear aryl and halogenoaryl radicals having from 6 to 8 carbon atoms, such as phenyl, tolyl, xylyl, chlorophenyl, dichlorophenyl and trichlorophenyl radicals; and (v) cyanoalkyl radicals of which the alkyl radicals have from 2 to 3 carbon atoms, such as β-cyanoethyl and γ-cyanopropyl radicals.

Specific examples of representative alkoxy radicals having from 1 to 4 carbon atoms and represented by the radicals R' are methoxy, ethoxy, n-propoxy, isopropoxy and n-butoxy radicals.

Exemplary of units essentially constituting the diorganopolysiloxane oils $A_1$, representative are, respectively, the units $R_2SiO$ of the formulae:
$(CH_3)_2SiO$, $(CH_3)(CH_2=CH)SiO$, $CH_3(C_6H_5)SiO$, $(C_6H_5)_2SiO$,
$C_6H_5(CH_2=CH)SiO$, $CF_3CH_2CH_2(CH_3)SiO$,
$NC-CH_2CH_2(CH_3)SiO$, $NC(CH_2)_3CH_3SiO$
and the units $R_2R'SiO_{0.5}$ of the formulae
$(CH_3)_3SiO_{0.5}$, $CH_2=CH(CH_3)_2SiO_{0.5}$, $(CH_3)_2C_6H_5SiO_{0.5}$,
$CH_3(C_6H_5)(CH_2=CH)SiO_{0.5}$, $HO(CH_3)_2SiO_{0.5}$,
$HO(CH_3)(CH_2=CH)SiO_{0.5}$,
$CH_3O(CH_3)_2SiO_{0.5}$, $CH_3CH_2O(CH_3)_2SiO_{0.5}$,
$CH_3OCH_2CH_2O(CH_3)_2SiO_{0.5}$ It is preferred to use dimethylpolysiloxane oils containing a small amount of vinyl radicals, representing, for example, from 0.005 to 0.5% of the weight of the oils; these vinyl radicals are present in the form of units of the formulae $CH_3(CH_2=CH)SiO$ and/or $(CH_3)_2CH_2=CHSiO_{0.5}$ and the oils are end-blocked by units of the formulae $(CH_3)_3SiO_{0.5}$ and/or $(CH_3)_2CH_2=CHSiO_{0.5}$.

The diorganopolysiloxane oils $A_1$ are widely marketed by silicone manufacturers; furthermore, they can easily be prepared utilizing techniques already well known to this art. Thus, one of the more common techniques consists of polymerizing diorganocyclopolysiloxanes using catalytic amounts of alkaline or acid agents. The following are added to the reaction mass during this polymerization:

(1) (if R'=R), low molecular weight diorganopolysiloxanes of the formula $R_3SiO(R_2SiO)_xSiR_3$, x having a value sufficient to provide a viscosity ranging from 0.5 to 100 mPa.s at 25° C., (2) (if R'=OH), water and/or oil of the formula $HOR_2SiO(SiR_2O)_ySiR_2OH$, y having a value sufficient to provide a viscosity ranging from 5 to 200 mPa.s at 25° C., and (3) (if R′=alkoxy or CH₃OCH₂CH₂O), the corresponding alcohol R′H and/or a low molecular weight oil of the formula R′R₂SiO(R₂SiO)$_z$SiR₂R′, z having a value sufficient to provide a viscosity ranging from 0.5 to 120 mPa.s at 25° C.

The polymers obtained are preferably purified by removing, at a temperature which is typically above 70° C. and under a pressure which is typically below atmospheric pressure, the unconverted starting compounds present when the polymerization reaction is at equilibrium, and also the low molecular weight polymers which may have been formed during this reaction. It is recommended to neutralize the alkaline or acid agents used as polymerization catalysts, prior to distilling the volatile products.

The silicas $B_1$ are used in an amount of 10 to 75 parts and preferably 15 to 70 parts per 100 parts of the diorganopolysiloxane oils $A_1$.

Such silicas are selected from among pyrogenic silicas and precipitated silicas. The weight ratio of these two types of silicas to one another can vary from 0 to 100%. They have a specific surface area (measured in accordance with the BET method) which is at least 50 m²/g, is preferably more than 80 m²/g and can even exceed 350 m²/g, an average size of the primary particles of less than 80 nm and a bulk density of less than 250 g/liter.

These silicas are marketed by manufacturers of inorganic fillers. Said silicas can be used as such, which is preferable in view of the fact that this is the least expensive solution, or, alternatively, they can be used after treatment with organosilicon compounds conventionally used for this purpose and available on the chemical products market. Compounds of this type are represented, for example, by methylpolysiloxanes such as hexamethyldisiloxane and octamethylcyclotetrasiloxane, methylpolysilazanes such as hexamethyldisilazane and hexamethylcyclotrisilazane, chlorosilanes such as dimethyldichlorosilane, trimethylchlorosilane, methylvinyldichlorosilane and dimethylvinylchlorosilane, and alkoxysilanes such as dimethyldimethoxysilane, trimethylmethoxysilane, trimethylethoxysilane and dimethylvinylethoxysilane.

During this treatment, the aforementioned organosilicon compounds become attached to the surface of the silicas and/or react with this zone, in particular with the hydroxyl groups borne thereby. This results in the provision of units selected from the group comprising those of the formulae (CH₃)₃SiO, (CH₃)(CH₂=CH)SiO, (CH₃)₃SiO₀.₅ and (CH₃)₂(CH₂=CH)SiO₀.₅. The treated silicas can thus increase their initial weight by a percentage ranging up to 20% and generally up to 15%.

The treated silicas are advantageously present in amounts of at least 5% and preferably 7% of the total amount of silica employed.

The structuring inhibitors $C_1$ are used in amounts of 1 to 20 parts and preferably 2 to 15 parts per 100 parts of the diorganopolysiloxane oils $A_1$. Their presence prevents the compositions from changing with time, a change generally resulting in a decrease in the value of the penetrations.

Exemplary such structuring inhibitors comprise:
(i) diorganopolysiloxane oils having low viscosities on the order of 5 to 500 mPa.s at 25° C., and blocked at each end of their chain by a hydroxyl radical and/or an alkoxy radical having from 1 to 3 carbon atoms. The organic radicals bonded to the silicon atoms in these oils are preferably methyl, ethyl, vinyl, phenyl or 3,3,3-trifluoropropyl radicals.

Specific examples of these oils which are representative are α,ω-dihydroxydimethylpolysiloxane, α,ω-dihydroxymethylphenylpolysiloxane, α,ω-dimethoxydimethylpolysiloxane and α,ω-dimethoxymethylphenylpolysiloxane oils having from 3 to 12% of hydroxyl or methoxy radicals.

(ii) diphenylsilanediol and the silanes of the formulae:

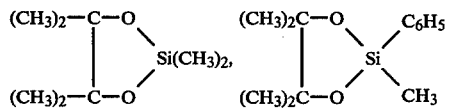

The 2,4-dichlorobenzoyl peroxide $D_1$ is used in an amount of 0.1 to 4 parts and preferably 0.15 to 3.5 parts per 100 parts of the diorganopolysiloxane oils $A_1$.

Other ingredients, apart from the compounds $A_1$, $B_1$, $C_1$ and $D_1$, can be introduced into the compositions according to the invention. Thus, coarser inorganic fillers having a particle diameter of more than 0.1μ can be combined with the finely divided silicas $B_1$. These fillers are represented, for example, by ground quartz, calcined clays, diatomaceous silicas, calcium carbonate and the oxides of iron, titanium, magnesium and aluminum.

These ingredients are introduced in an amount of at most 120 parts and preferably 100 parts per 100 parts of the diorganopolysiloxane oils $A_1$. Such fillers can be used as such or after they have been treated with the organosilicon compounds already mentioned for the treatment of the finely divided silicas $B_1$.

Pigments, heat stabilizers (such as iron carboxylates and manganese carboxylates) and combustion retarders, such as platinum derivatives, can also be introduced.

The platinum derivatives (which are typically selected from among chloroplatinic acid and complexes or reaction products of this acid, or of other platinum chlorides with organic or organosilicon derivatives) are preferably combined with cerium oxides and hydroxides or pyrogenic titanium/iron oxides. Combinations of this type, and their introduction into organopolysiloxane compositions which undergo thermosetting to form elastomers, are described, in particular, in U.S. Pat. Nos. 3,635,874, 3,821,160 and in French Patent No. 2,203,846.

Other adjuvants can also be used for the purpose of improving the mechanical properties and the adhesion to various substrates. These adjuvants include, for example, the silanes of the formulae below and their products of partial hydrolysis and of partial co-hydrolysis:

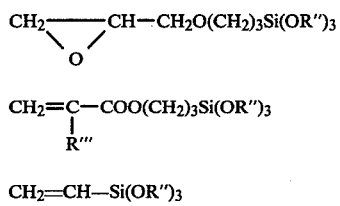

The symbols R″ represent methyl, ethyl, n-propyl or β-methoxyethyl radicals; the symbol R‴ represents a hydrogen atom or the methyl radical.

Specific examples of these silanes which are representative are those of the formulae:

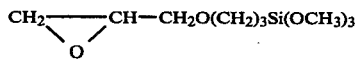

These adjuvants are used in amounts of 0.05 to 5 parts and preferably 0.1 to 4 parts per 100 parts of the diorganopolysiloxane oils $A_1$.

The compositions according to the invention are prepared by intimately mixing the various constituents $A_1$, $B_1$, $C_1$ and $D_1$ and, if appropriate, the other substances and adjuvants mentioned above. This mixing is carried out in any suitable apparatuses used by rubber manufacturers. However, in view of the choice of the constituents, it is much easier to obtain homogeneous mixtures with less powerful means and in a shorter time than for the preparation of customary organopolysiloxane compositions containing diorganopolysiloxane gums in place of the oils $A_1$.

In particular, roller mills cannot be used, which is an advantage because they are time-consuming and energy-consuming. On the other hand, it is possible to employ kneaders, or cylindrical-tube mixers equipped with screws, operating continuously or batchwise. In these cylindrical-tube mixers, the screws rotate and can also be subjected to reciprocating movements.

The various constituents can be introduced into the aforementioned apparatuses in any order. Nevertheless, if the mixtures of the constituents are heated to temperatures above 60°–80° C., for example for the purpose of accelerating the wetting of the fillers $B_1$ by the oils $A_1$ (which makes it possible to reduce the residence time in the apparatus), it is then necessary to add the 2,4-dichlorobenzoyl peroxide $D_1$ last, and only when the temperature of the mixtures had decreased to a suitable level.

The compositions obtained are pasty products of which the penetration value, measured in accordance with French Standard Specification T 60-132, ranges from 90 to 350 and generally from 100 to 330. They are almost as easy to handle as the silicone mastics which harden at or above ambient tempeature in the presence of moisture, or the organopolysiloxane compositions which harden by the SiH/Si-vinyl addition reaction.

In the process according to the invention, the above compositions are hardened by injection molding using injection-molding machines analogous to those used for low-viscosity and medium viscosity plastics in the molten state.

These injection-molding machines are well known; they are employed, for example, for molding polystyrene, polyethylene, polyamide and cellulose acetate. Same typically comprise:

[1] an injection cylinder housing a screw or a piston, the front of which is equipped with an injection nozzle;
[2] a pressure mechanism transmitting, to the piston or to the screw, the force necessary for injecting the products;
[3] a mold with two dies, opening at the rear; and
[4] a mold-locking device ensuring the closing and opening of the mold and the ejection of the moldings.

Being pasty, the subject compositions can be introduced into the feed system of the injection-molding machines by simply pumping, using piston pumps. They are then injected, under a pressure of less than 45 MPa and preferably of less than 40 MPa, into a mold heated to a temperature within the range from 125° to 215° C. and preferably 130° C. to 215° C. The hardening time in the mold is less than 15 seconds and preferably less than 12 seconds and the total molding cycle is less than 25 seconds and preferably less than 22 seconds. It is thus possible to conduct at least 144 moldings per hour and preferably 163 moldings.

This process enables those skilled in the art of injection-molding silicon rubbers to operate at high rates within a normal temperature range which is easy to regulate. It has the further advantage of using "single-component" past compositions, thus dispensing with pre-determinations and premixing operations, which are frequently sources of errors and time losses, and also the advantage of ensuring the hardening of the compositions without risk of pre-vulcanization and hence of scorching. The pasty compositions which harden by the SiH/Si-vinyl addition reaction do not always possess the aforesaid advantages.

The process of the present invention makes it possible to manufacture moldings of all shapes and sizes, having good physical properties and tensile strength characteristics; it is particularly good for the manufacture of spark-plug caps, headlamp housings, electrical connectors and O-ring seals.

In order to further illustrate the present invention and the advantages thereof, the following specific examples are given, it being understood that same are intended only as illustrative and in nowise limitative.

EXAMPLE 1

The following ingredients were charged into a kneader:
(i) 100 parts of an α,ω-bis-(dimethylvinylsiloxy)-dimethylpolysiloxane oil having a viscosity of 100,000 mPa.s at 25° C.;
(ii) 4 parts of an α,ω-dihydroxydimethylpolysiloxane oil having a viscosity of 50 mPa.s at 25° C.;
(iii) 10 parts of a pyrogenic silica having a BET specific surface area of 200 m$^2$/g, an average size of the primary particles of 21 nm and a bulk density of 50 g/liter; and
(iv) 35 parts of a precipitated silica having a BET specific surface area of 170 m$^2$/g, a bulk density of 70 g/liter and an average diameter of the primary particles of 18 nm.

The mixture, after being subjected to efficient malaxation, was heated progressively to 150° C. and was then malaxated at this temperature for 1 hour. After cooling to about 30° C., 2.25 parts of a paste formed by dispersing 50 parts of 2,4-dichlorobenzoyl peroxide in 50 parts of an α,ω-bis-(trimethylsiloxy)-dimethylpolysiloxane oil having a viscosity of 1,000 mPa.s at 25° C. were added to the mixture.

The composition obtained (designed $S_1$) had a penetration, measured in accordance with French Standard Specification T 60-132 (corresponding to ASTM Standard Specification D 217-68), of 190. This composition $S_1$ was hardened to form 2 mm thick elastomer plates by heating in a mold for 8 minutes, at 115° C., under a pressure of 50 bars. The plates were then heated for 4 hours at 200° C., in the ambient atmosphere, in a ventilated oven.

The following properties were measured on these plates by taking standardized samples:

(1) Shore A hardness according to ASTM Standard Specification D 2240;
(2) Tensile strength in MPa, according to AFNOR Standard Specification T 46-002 (corresponding to ASTM Standard Specification D 412);
(3) Elongation at break in %, according to the above Standard Specification.

The results of the aforesaid measurements were as follows:

| Shore hardness | 56 |
|---|---|
| Tensile strength | 7.5 MPa |
| Elongation at break | 510% |

Another portion of composition $S_1$ was introduced directly, by means of a lift-and-force pump, into the body of a conventional injection-molding machine for plastics.

This machine consisted of:
(i) a cylindrical tube terminating in an injection nozzle equipped with a plug, and housing a screw having a diameter of 52 mm and a length of 12 times this diameter; and
(ii) a mold having two mating dies and 4 mold cavities, located at the outlet of the tube and heated to a temperature of 150° C.

The screw injected about 43 g of composition $S_1$ into the mold under an injection pressure of 10 MPa. The hardening time in the mold was 10 seconds. The molding cycle was 20 seconds; 180 moldings were therefore carried out per hour. The moldings had an excellent appearance and were easy to release from the mold; it was not necessary to deflash the moldings.

The temperature of the mold was raised to 180° C.: the injection pressure was 15 MPa but the hardening time in the mold remained at 10 seconds and the molding cycle time remained at 20 seconds. The temperature of the mold was raised to 200° C.: the injection pressure was 37 MPa but the hardening time and the molding cycle did not change. Furthermore, it was noted that the moldings had an excellent appearance at 180° or 200° C.

By way of comparison, composition $S_1$ was modified by using 1.5 parts of 2,5-bis-(t-butylperoxy)-2,5-dimethylhexane, during its preparation, in place of 2.25 parts of the paste formed by dispersing 50 parts of 2,4-dichlorobenzoyl peroxide in 50 parts of a silicone oil. This new composition was injection-molded in the machine described above. It was found that, in order to obtain high-quality moldings, it was necessary to operate at a temperature of 200° C. with a hardening time in the mold of 20 seconds and an injection pressure of 7.5 MPa. The molding cycle was 30 seconds; thus, only 120 moldings were realized per hour, instead of the 180 as above.

Also by way of comparison, composition $S_1$ was modified by replacing the 100 parts of the silicone oil having a viscosity of 100,000 mPa.s at 25° C. during its preparation, by 100 parts of an $\alpha,\omega$-bis-(dimethylvinyl)-polydimethylsiloxane gum having a viscosity of 50 million mPa.s at 25° C.

This new composition of rubbery appearance cannot be pumped; it was placed by hand in the injection cylinder of the injection-molding machine described above. It was then injection-molded. It was found that, in order to obtain high-quality moldings, it was necessary to operate at a temperature of 120° C. with a hardening time in the mold of 20 seconds and a minimum injection pressure of 40 MPa. The molding cycle was 30 seconds. A molding experiment was carried out at a molding temperature of 150° C. (in an attempt to reduce the hardening time); it provided moldings which were incomplete or deformed as a result of both scorching (premature hardening) of the composition, and of an excessive demand for injection pressure, which cannot be supplied by the machine.

EXAMPLE 2

Four compositions, $S_2$, $S_3$, $S_4$ and $S_5$, were prepared following the procedure for the manufacture of composition $S_1$. However, modifications were made as regards the amount by weight and/or the nature of the silicas introduced into composition $S_1$. These modifications, and also the addition of other constituents, are indicated below:

COMPOSITION $S_2$

The 10 parts of pyrogenic silica having a BET specific surface area of 200 m$^2$/g and the 35 parts of precipitated silica having a BET specific surface area of 170 m$^2$/g were replaced by 45 parts of a precipitated silica treated with dimethyldichlorosilane and having a BET specific surface area of 140 m$^2$/g, an average diameter of the primary particles of 17 nm and a bulk density of 128 g/liter.

COMPOSITION $S_2$

The 10 parts of pyrogenic silica having a BET specific surface area of 200 m$^2$/g were replaced by 10 parts of precipitated silica having a BET specific surface area of 170 m$^2$/g; the amount of the latter silica present in composition $S_3$ was therefore 45 parts.

COMPOSITION $S_4$

The 35 parts of precipitated silica having a BET specific surface area of 170 m$^2$/g were replaced by 15 parts of a pyrogenic silica treated with octamethylcyclotetrasiloxane and having a BET specific surface area of 300 m$^2$/g, an average diameter of the primary particles of 8 nm and a bulk density of 60 g/liter.

COMPOSITION $S_5$ 0.1 parts of the silane of the formula $CH_2=C(CH_3)COO(CH_2)_3Si(OCH_3)_3$ was added to the constituents of $S_1$.

A portion of each of the compositions $S_2$, $S_3$, $S_4$ and $S_5$ was removed and its penetration was measured. The mechanical properties of the elastomers produced by hardening these compositions was also measured. The measurement techniques and the hardening process are those described in Example 1.

The results were as follows:

TABLE I

| | PENE-TRATION | SHORE A HARDNESS | TENSILE STRENGTH IN MPa | ELONGATION AT BREAK IN % |
|---|---|---|---|---|
| $S_2$ | 300 | 49 | 6.7 | 400 |
| $S_3$ | 220 | 56 | 6.6 | 340 |
| $S_4$ | 190 | 43 | 7.5 | 600 |
| $S_5$ | 160 | 61 | 7.2 | 290 |

Another portion of each of the compositions $S_2$, $S_3$, $S_4$ and $S_5$ was injection-molded on the injection-molding machine described in Example 1; the mold was heated to 150° C. and the injection pressure was on the order of 10 MPa.

It was found that high-quality moldings were obtained, for the four compositions, with a hardening time in the mold of 8 seconds and a molding cycle time of 18 seconds. Thus, 200 moldings were carried out per hour (the portions of the four compositions $S_2$, $S_3$, $S_4$ and $S_5$ were obviously introduced into the injection-molding machine by pumping in accordance with the process indicated in Example 1 for the introduction of composition $S_1$).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of an injection-molded, elastomeric shaped article, comprising injection-molding, at a temperature ranging from about 125° C. to about 225° C., a pasty organopolysiloxane composition of matter having a viscosity ranging from about 4,000 to 55,000 Pa.s at 25° C. comprising an intimate admixture of:
   ($A_1$) 100 parts by weight of a diorganopolysiloxane oil having a viscosity of 500 to 300,000 mPa.s at 25° C., consisting essentially of recurring units of the formula $R_2SiO$ and blocked at each end of the chain by units of the formula $R_2R'SiO_{0.5}$, in which formulae the symbols R, which are identical or different, represent hydrocarbon radicals which are unsubstituted or substituted by halogen atoms or cyano groups and which have 1 to 8 carbon atoms, and the symbol R' represents the same radicals as the symbols R and also a hydroxyl radical, an alkoxy radical having from 1 to 4 carbon atoms or a β-methoxyethoxy radical;
   ($B_1$) 10 to 75 parts by weight of a finely divided, reinforcing silica having a specific surface area of at least 50 m²/g;
   ($C_1$) 1 to 20 parts by weight of a structuring inhibitor; and
   ($D_1$) 0.1 to 4 parts by weight of 2,4-dichlorobenzoyl peroxide cross-linking agent.

2. The process as defined by claim 1, wherein said injection-molding is carried out at a temperature ranging from 130° C. to 215° C.

3. The process as defined by claim 1, wherein said injection-molding is conducted utilizing a hardening time of less than about 15 seconds and a molding cycle of less than about 25 seconds.

4. The process as defined by claim 3, wherein said hardening time being less than about 12 seconds and said molding cycle being less than about 22 seconds.

5. The process as defined by claims 1 or 3, wherein at least 5% by weight of the reinforcing silica $B_1$ is treated with an organosilicon composition providing $(CH_3)_2SiO$, $CH_3(CH_2=CH)-SiO$, $(CH_3)_3SiO_{0.5}$ or $(CH_3)_2CH_2=CHSiO_{0.5}$ units attached to the surface thereof.

6. The process as defined by claim 3, said reinforcing silica $B_1$ comprising from 0 to 100% by weight of pyrogenic silica, 0 to 100% by weight of precipitated silica, an admixture of pyrogenic and precipitated silicas.

7. The process as defined by claim 6, said reinforcing silica $B_1$ comprising admixture of pyrogenic and precipitated silicas.

8. The process as defined by claim 6, further comprising, in an amount ranging from 0.05 to 5 parts by weight per 100 parts by weight of the constituent $A_1$, of an adjuvant selected from the group consisting of:
   (i) a silane of the formulae:

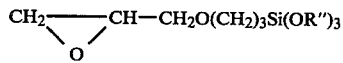

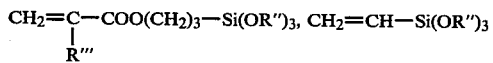

in which the symbols R'' represent methyl, ethyl, n-propyl or β-methoxyethyl radicals and the symbol R''' represents a hydrogen atom or the methyl radical, and
   (ii) a product of partial hydrolysis or partial co-hydrolysis of said silanes.

9. The process as defined by claim 6, wherein said structuring inhibitor $C_1$ comprising a diorganopolysiloxane oil having a viscosity ranging from about 5 to about 500 mPa.s at 25° C., and chain terminated with either a hydroxyl radical and/or an alkoxy radical having from 1 to 3 carbon atoms.

10. The process as defined by claim 3, wherein said injection-molding is conducted at an injection pressure of less than 45 MPa.

11. The process as defined by claim 10, wherein said injection-molding is conducted at an injection pressure of less than 40 MPa.

* * * * *